United States Patent

[11] 3,582,720

[72] Inventor Konstantin Apel
Lehrenweg, Germany
[21] Appl. No. 835,692
[22] Filed June 23, 1969
[45] Patented June 1, 1971
[73] Assignee Firma Holzer Patent AG
[32] Priority June 21, 1968
[33] Germany
[31] P 17 63 547.1

[54] BRIDGE CIRCUIT
3 Claims, 4 Drawing Figs.

[52] U.S. Cl. ........ 317/153, 307/116
[51] Int. Cl. ........ H01h 47/36
[50] Field of Search ........ 317/153; 323/75 B, 75 E, 75 L; 335/183

[56] References Cited
UNITED STATES PATENTS

| | | | |
|---|---|---|---|
| 2,349,849 | 5/1944 | Deal | 317/149 |
| 3,089,065 | 5/1963 | Warden | 317/132X |
| 3,113,249 | 12/1963 | Robb | 317/132 |
| 3,315,135 | 4/1967 | Thiele | 317/132X |
| 3,186,105 | 6/1965 | Nye et al | 317/132 |
| 1,275,536 | 8/1918 | Crittenden | 335/183 |
| 2,061,347 | 11/1936 | Coe | 335/183 |

*Primary Examiner*—Robert K. Schaefer
*Assistant Examiner*—William J. Smith
*Attorney*—Sherman Levy

ABSTRACT: A bridge circuit for controlling a relay as a function of measured value, and wherein there is provided a device that functions with only one current supply and with which it is possible to eliminate the need of high resistivity circuit elements.

PATENTED JUN 1 1971 3,582,720

INVENTOR:
KONSTANTIN APEL

By

Sherman Levy Attorney

BRIDGE CIRCUIT

The present invention relates to a bridge circuit for controlling a relay as a function of a measured value.

Bridge circuits of this type are known. One of these known circuits (FIG. 1) is supplied from two different current sources, for example. This arrangement therefore has the disadvantage of depending upon two supply sources.

Furthermore, a bridge circuit is known which admittedly functions with one source, but which must be equipped with resistors (FIG. 2, resistors 1 and 2) of high resistivity, which are unwieldy and cause heat losses. The power consumption of the whole circuit therefore is substantially increased.

This invention therefore is directed to avoiding the above-named disadvantages of known bridge circuits and to the creation of a device that functions with only one current supply and in which it is possible to do without high resistivity circuit elements. In accordance with this invention, this is accomplished in that two of the bridge resistors consist of two opposedly acting coils of a relay, while an amplifier whose control circuit constitutes the bridge diagonal is parallel to one relay coil.

According to a suitable embodiment of the present invention, a thyrister is used as an amplifier. The bridge circuit of this invention has the advantage as compared with known devices that because the components are of normal resistivity they can be small and operated with only one current source, and they function with relatively low current consumption.

The present invention will be discussed with reference to two embodiments, with the aid of the drawings, and the drawings show:

Figure 1:
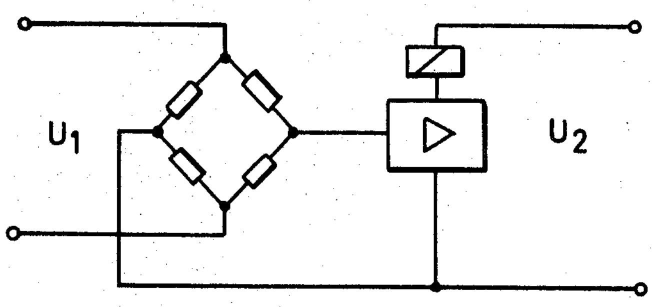
FIGS. 1 and 2 illustrate bridge circuits according to the state of the art.
Figure 2:
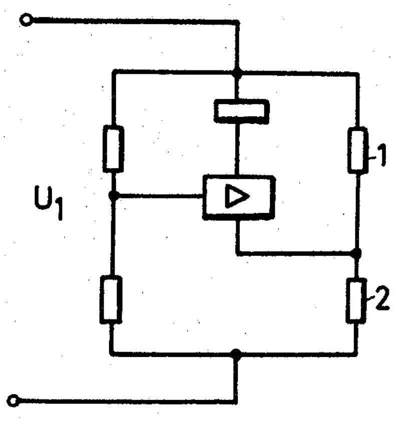

FIGS. 1 and 2 show known bridge circuits of the kind mentioned previously. For the operation of the circuit of FIG. 1 two different voltages $U_1$ and $U_2$ are required. In the modification of FIG. 2, resistors 1 and 2 must be designed for high resistivity.

Figure 3:
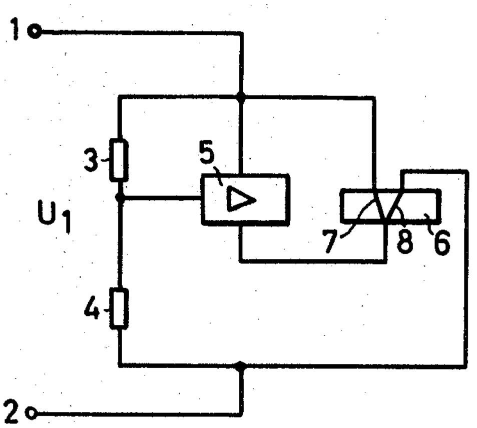
FIG. 3 illustrates a relay according to the invention, with an amplifier.

From FIG. 3 the current flow in the relay of the present invention connected with other circuit elements is apparent. A relay 6 shows two opposite coils 7 and 8. The ends of the coils are so applied to terminals 1 and 2, which in turn are connected to a current source (preferably delivering alternating current) that the magnetic fields building up in the coils exactly compensate. The relay therefore does not pull up.

The impedances of the two relay coils 7 and 8, together with a resistor 3 and a resistor 4 constitute a bridge circuit. The control circuit of an amplifier 5 lies in the diagonal of the bridge. The operating circuit of amplifier 5 is parallel to coil 7 of the relay 6. The relay with its two coil impedances is therefore a part of the bridge.

Figure 4:
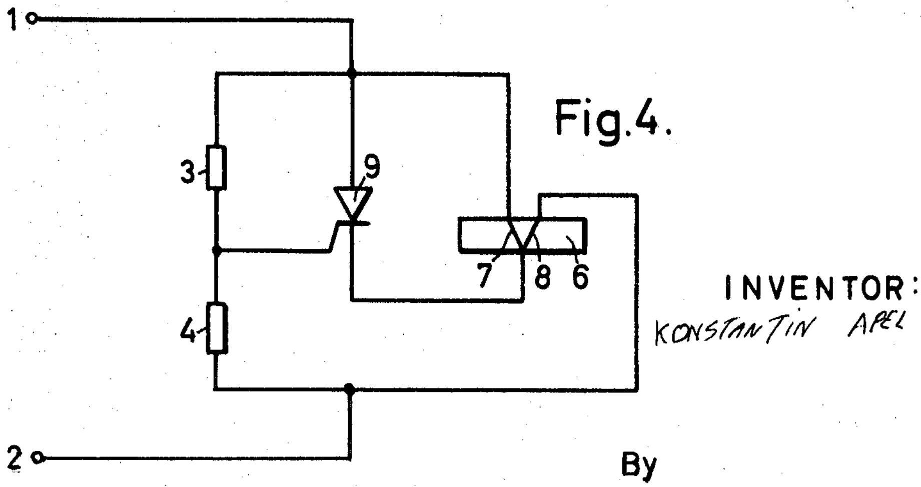
FIG. 4 shows the same relay as that of FIG. 3, but in combination with a thyrister.

If the bridge is unbalanced due to change in the resistors 3 and/or 4 which can be developed as temperature sensors, for example, then the control circuit of amplifier 5 is energized. The amplifier is then caused to draw current. The excitation in relay coil 8 thereby increases beyond that of relay coil 7, whereupon the relay pulls up. The use of a linear amplifier theoretically is possible. Its holding current can be taken into consideration in the initial design of the relay. In practice, a switching amplifier is preferable, however. A thyrister 9 (FIG. 4) can serve as switching amplifier. Alternating current or pulsed direct current can be supplied to this circuit.

It will now be clear that there is provided a device which accomplishes the objectives heretofore set forth. While the invention has been disclosed in its preferred form, it is to be understood that the specific embodiment thereof as described and illustrated herein is not to be considered in a limited sense as they may be other forms or modifications of the invention which should also be construed to come within the scope of the appended claims.

What I claim is:

1. A bridge circuit including at least two resistors as bridge elements for the control of a double-wound relay with two opposingly acting coils as a function of a measured value, characterized in that two of the remaining bridge elements are constituted by the two opposingly acting coils 7 and 8 of the relay 6, while a switching amplifier 5 whose control circuit forms the bridge diagonal is connected in parallel to one relay coil.

2. A bridge circuit as defined in claim 1, characterized in that a thyrister is used as the switching amplifier.

3. In combination, a double-wound relay having two opposingly acting coils, a pair of resistors, circuit means connecting the resistors and the two opposingly acting coils to define a bridge circuit with the two resistors connected in series as one side of the bridge circuit and the two opposingly acting coils connected in series as the other side of the bridge circuit, a switching amplifier connected across one of the relay coils, said amplifier having a control element, and circuit means connecting the control element to the junction of the series-connected resistors.